United States Patent
Singh et al.

[11] Patent Number: 6,110,301
[45] Date of Patent: Aug. 29, 2000

[54] LOW ALLOY BUILD UP MATERIAL

[75] Inventors: Daya Singh, Bowling Green, Ky.; Ravi Menon, Goodlettsville, Tenn.

[73] Assignee: Stoody Company, St. Louis, Mo.

[21] Appl. No.: 09/119,920

[22] Filed: Jul. 21, 1998

[51] Int. Cl.[7] .......................... C22C 38/08; C22C 38/12
[52] U.S. Cl. ..................... 148/336; 420/119; 420/123
[58] Field of Search ................... 420/119, 123; 428/682, 683; 148/336

[56] References Cited

U.S. PATENT DOCUMENTS

| | | | |
|---|---|---|---|
| 3,115,406 | 12/1963 | Ballass et al. | 75/124 |
| 3,162,751 | 12/1964 | Robbins | 219/137 |
| 3,581,054 | 5/1971 | Bjorkroth | 219/146 |
| 3,868,487 | 2/1975 | Ito et al. | 219/73 |
| 4,000,010 | 12/1976 | Sekimoto et al. | 148/3 |
| 4,331,741 | 5/1982 | Wilson | 428/679 |
| 4,404,450 | 9/1983 | Weldon | 219/76.12 |
| 4,430,545 | 2/1984 | Mori et al. | 219/73 |
| 4,561,888 | 12/1985 | Okuda et al. | 75/124 |
| 4,568,393 | 2/1986 | Kane et al. | 148/6.35 |
| 4,609,577 | 9/1986 | Long | 428/683 |
| 4,832,912 | 5/1989 | Yabuki et al. | 420/586 |
| 4,897,519 | 1/1990 | Clark et al. | 219/76.14 |
| 4,948,559 | 8/1990 | Oishi et al. | 420/584 |
| 5,081,760 | 1/1992 | Kikuhara et al. | 29/130 |
| 5,519,186 | 5/1996 | Sakurai et al. | 219/146.23 |

FOREIGN PATENT DOCUMENTS

| | | | |
|---|---|---|---|
| 53-27216 | 8/1978 | Japan | 420/119 |
| 53-27217 | 8/1978 | Japan | 420/119 |

OTHER PUBLICATIONS

Daya Singh, Microstructure and Properties of Ultra Low Carbon Bainitic Steel Weld Metal for HSLA–100, Jan. 1996.

*Primary Examiner*—Deborah Yee
*Attorney, Agent, or Firm*—Senniger, Powers, Leavitt & Roedel

[57] ABSTRACT

A low alloy steel for use in building up industrial components subjected to service conditions requiring good impact toughness, resistance to tempering, and resistance to temper embrittlement, for example, for use as a build up layer for steel mill caster rolls and a submerged arc welding wire for deposition thereof. The composition of low alloy steel has less than about 0.1% C by weight, between about 1.5% and about 5.0% Ni by weight, and between about 0.5% and about 3.0% Mo by weight. Vanadium, Cr, and other carbide-formers are excluded from the low alloy steel sufficiently to avoid any significant precipitation of carbides upon deposition of the low alloy steel by welding onto an industrial component.

30 Claims, 3 Drawing Sheets

LOW ALLOY BUILD UP MATERIAL

BACKGROUND OF THE INVENTION

This invention relates to an alloy for use in building up industrial components subjected to service conditions requiring good impact toughness, resistance to tempering, and resistance to temper embrittlement. One such application of particular interest is for use in building up and reconditioning steel mill caster rolls.

Steel mill caster rolls typically have a forged or cast core substrate, a build-up layer (also referred to as simply a build up), and an overlayer of stainless steel overlay. It is critical that the build up layer have high yield strength so that the caster roll has sufficient compressive strength that it does not deform in service. It is also critical that the build up layer have high impact toughness so that cracks which tend to form in the overlayer do not propagate into and through the build up layer, that is, to help ensure that surface cracks in the overlay remain in the overlay. Two alloys which are commonly used as build up are as follows:

|    | Alloy 1 | Alloy 2 |
|----|---------|---------|
| C  | 0.13    | 0.08    |
| Mn | 1.0     | 1.0     |
| Si | 0.5     | 0.5     |
| Cr | 2.0     | 1.5     |
| Ni | —       | 1.0     |
| Mo | 0.5     | 0.4     |
| V  | —       | 0.15    |
| Fe | Bal.    | Bal.    |
| (all % by weight) | | |

These prior alloys are susceptible to temper embrittlement, have low toughness, and are sensitive to cooling rate. Temper embrittlement, in particular, is a loss in toughness due to reheating of a metal deposit, corresponding to reduced Charpy V notch values, and is primarily attributable to carbide precipitation and increase in hardness. As such, these prior alloys can only be deposited employing a narrow cooling rate range in order to achieve the required properties, as cooling rate affects carbide precipitation. It is therefore necessary to interrupt deposition as the welding deposition interpass temperature (IPT) gets sufficiently high as to result in a cooling rate which is sufficiently low to promote carbide precipitation. Having to repeatedly interrupt the deposition of build up significantly reduces productivity. The susceptibility of these alloys to temper embrittlement and sensitivity to cooling rate also has a tendency to reduce the quality and consistency in the build up.

SUMMARY OF THE INVENTION

It is an object of the invention, therefore, to provide an alloy for building up industrial components subjected to manufacturing and service conditions requiring high yield strength, good impact toughness, resistance to tempering, temper embrittlement, and high-temperature abrasion; to provide an alloy for use in building up and reconditioning steel mill caster rolls; to provide such an alloy which has reduced susceptibility to temper embrittlement and reduced sensitivity to cooling rate and interpass temperature; to provide such an alloy which has enhanced toughness; to provide such an alloy which can be readily deposited using easily manufactured wire.

Briefly, therefore, the invention is directed to a low alloy steel for use in building up industrial components. In one aspect the alloy is in the form of a build up layer on an industrial component. In another aspect the alloy is in the form of a wire for use in depositing a build up layer by welding. The alloy steel has less than about 0.1% C by weight, between about 1.5% and about 5.0% Ni by weight, and between about 0.5% and about 3.0% Mo by weight. Vanadium and Cr are excluded from the low alloy steel sufficiently to avoid any significant precipitation of V carbide and Cr carbide upon deposition of the low alloy steel by welding onto an industrial component.

Other objects and features of the invention will be in part apparent and in part pointed out hereinafter.

DETAILED DESCRIPTION OF THE INVENTION

Figure 1:
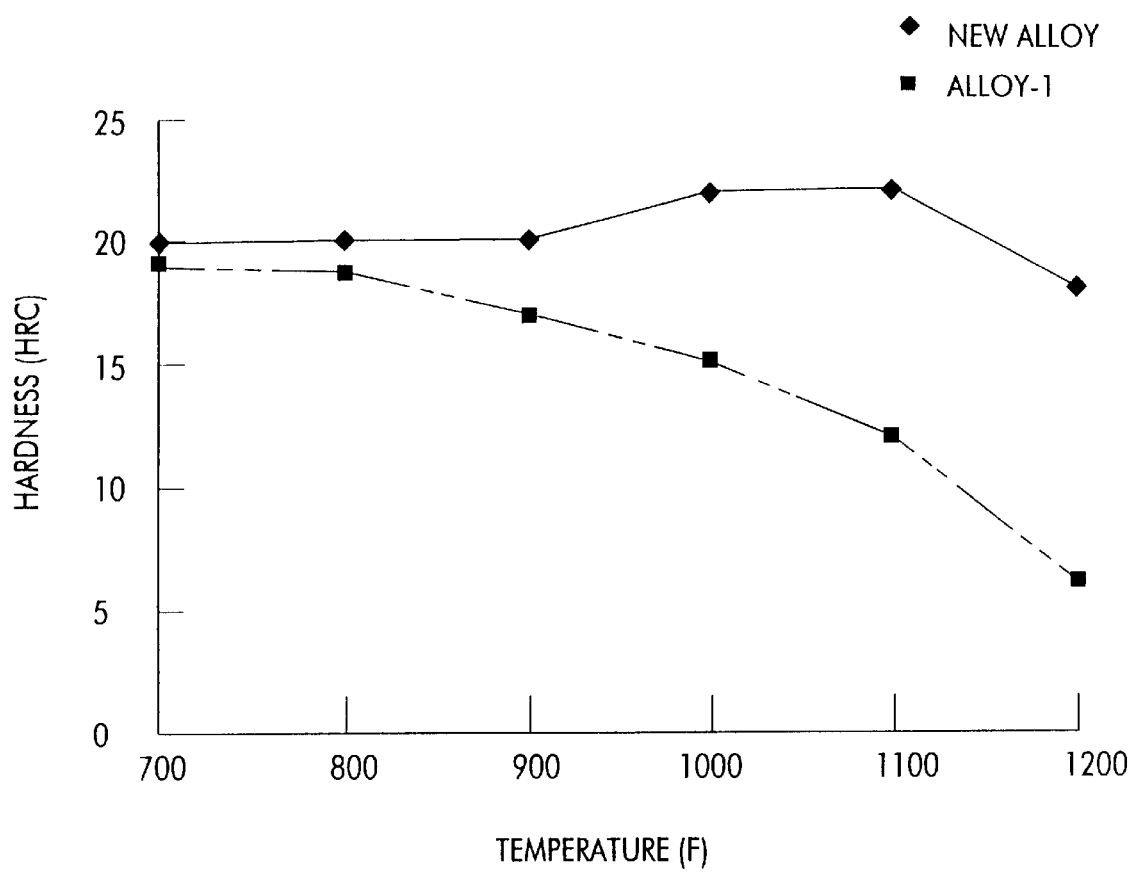
FIG. 1 is a graph comparing the temper response of the alloy of the invention to a prior art alloy.

By incorporation of its stated components in the combinations described in detail below, the present invention achieves reduced sensitivity to cooling rate and interpass temperature, while achieving yield strength, compressive strength, and impact toughness critical to, for example, caster rolls. Interpass temperature corresponds to the temperature of a substrate onto which a weld deposit is applied. The substrate may consist of substrate as it is normally understood, such as a core of a caster roll, or to material deposited in an immediately preceding welding pass. An interpass temperature of 325° F. results in a faster cooling rate for the weld deposit material than, e.g., an interpass temperature of 500° F., because the substrate onto which material is deposited is cooler. As a general proposition with alloys containing carbide-forming elements, a faster cooling rate resulting from a lower interpass temperature is required to maintain carbide-forming elements in solid solution. If carbide-forming elements are not maintained in solution but are allowed to precipitate as carbides, there can be deleterious effects as carbides can serve as crack initiation sites. A faster cooling rate resulting from a lower interpass temperature addresses the carbide formation problem, but introduces its own problem, namely, reduced productivity as time must be allowed for the substrate to cool between passes. The alloys of the invention, however, are less sensitive to cooling rate, such that they can be deposited with less attention to interpass temperature, and thus with fewer interruptions for cooling, and thus with greater productivity.

The alloy of the invention contains a maximum C content of about 0.1%. The C content is preferably in the range of about 0.001 to about 0.06%. All percentages noted in this specification are by weight, and refer to elemental compositions, although such elements may be in a combined form in the alloy. Carbon increases the maximum attainable hardness, but C content is maintained below the above upper limits to avoid the formation of carbides, which can serve as initiation sites for cracking. Carbon content is also kept below these upper limits to maintain acceptable toughness. By maintaining C content in this range, required strength and toughness are achieved in a broader welding parameter range, such that interruptions associated with IPT sensitivity are reduced, and productivity is increased. Stated another way, problems associated with increased hardenability, in particular a narrow welding parameter window in which required strength and toughness are attainable, are reduced.

The Mn content of the alloy is maintained in the range of about 0.5% to about 3.0%, preferably in the range of about 0.5% to about 2.0%. Manganese has a solid solution strengthening effect in metals of the composition of the invention. Manganese significantly below the 0.5% specified does not provide the desired strengthening effect while Mn significantly above the specified upper limit tends to promote the formation of mixed microstructures of bainite and martensite, especially in the presence of up to about 1% Si.

The alloys of the invention contain from about 1.5% to about 5.0% Ni, preferably from about 1.5% to about 3.0%, to provide enhanced impact toughness. While Ni values below about 1.5% do not provide adequate toughness, Ni values significantly above the upper limits are avoided because there is no appreciable improvement in impact toughness in the context of the overall composition of the invention.

Molybdenum is incorporated into the alloys in the range of from about 0.5% to about 3.0%, preferably from about 0.5% to about 2.0%, for its solid solution strengthening effect. At the ultra low C levels of the invention, Mo advantageously promotes the formation of bainitic microstructures over a wide range of cooling rates. This is especially important in the context of the present invention, because it increases the range of welding parameters under which toughness critical to the efficiency of the deposit can be achieved.

Titanium is incorporated into the alloys of the invention in amounts up to about 0.05%, preferably within the range of about 0.01% to about 0.04%. The function of the Ti is to getter oxygen from solid solution, since oxygen in solid solution negatively affects toughness. Titanium in amounts above about 0.5% are avoided because of adverse effects on microstructure and toughness.

Vanadium is known to increase hardenability and provide solid solution strengthening. However, intentional additions of V are specifically avoided in this invention because V has a tendency to render the alloys sensitive to cooling rate and susceptible to temper embrittlement. Vanadium is a strong carbide former, and carbides in deposited weld metal can block dislocation slip bands, reducing ductility. Carbides can also crack or separate from a metallic matrix under stress, thus generating microcracks which can act as crack growth sites and adversely affect toughness. Repeated heating and cooling of V-containing steels can lead to the formation of coarse carbides drastically lowering weld metal toughness. By eliminating more than incidental V, it has been discovered that the desired mechanical properties can be achieved while using a much broader range of welding parameters. This is critical in the specific context of surfacing of steel mill rolls where high interpass temperatures are encountered unless the surfacing process is repeatedly interrupted. Avoidance of such repeated interruptions is advantageously facilitated by the elimination of V, because such elimination reduces the sensitivity of the alloys to cooling rates, and consequently promotes tolerance for high IPTs. Accordingly, V is excluded from the alloys of the invention sufficiently to avoid any significant precipitation of V carbides, preferably any precipitation of V carbides at all. Preferably, the alloys contain essentially no V; more preferably, they contain no V.

Chromium has been incorporated into high alloy steels to provide corrosion resistance and high temperature strength, and has been incorporated into low alloy steels to increase hardenability and solid solution strengthening. Chromium, like V, is a strong carbide former, and carbides in deposited weld metal can block dislocation slip bands, reducing ductility. Carbides can also crack or separate from a metallic matrix under stress, thus generating microcracks which can act as crack growth sites and adversely affect toughness. Repeated heating and cooling of Cr-containing alloys can lead to the formation of coarse carbides drastically lowering weld metal toughness. Intentional additions of Cr are specifically avoided in this invention because Cr has a tendency to render the alloys sensitive to cooling rate and susceptible to temper embrittlement. By eliminating more than incidental Cr, it has been discovered that the desired mechanical properties can be achieved while employing a much broader range of welding parameters. This is critical because in the specific context of surfacing of steel mill rolls high interpass temperatures are encountered unless the surfacing process is repeatedly interrupted. Avoidance of such repeated interruptions is advantageously facilitated by the elimination of Cr, because such elimination reduces the sensitivity of the alloys to cooling rates, and consequently promotes tolerance for high IPTs. Accordingly, Cr is excluded from the alloys of the invention sufficiently to avoid any significant precipitation of Cr carbides, preferably any precipitation of Cr carbides at all. Preferably, the alloys contain essentially no Cr; more preferably, they contain no Cr.

Other elements which are carbide formers in the context of the alloys of the overall composition of the alloys of the invention are also preferably avoided. Accordingly, carbide forming elements are excluded from the alloys of the invention sufficiently to avoid any significant precipitation of carbides, preferably any precipitation of carbides at all. Preferably, the alloys contain essentially no carbide formers; more preferably, they contain no carbide formers. Among such carbide formers, Nb, W, and B are excluded from the alloys of the invention sufficiently to avoid any significant precipitation of Nb, W, and B carbides, preferably any precipitation of such carbides at all. Preferably, the alloys contain essentially no Nb, W, or B; more preferably, they contain no Nb, W, or B.

The microstructure of the alloy of the invention consists of entirely carbide-free bainitic ferrite. The alloy contains essentially no polygonal ferrite, essentially no martensite, and essentially no austenite.

The alloy of the invention contains the following constituents:

| C | ≦0.1 |
|---|---|
| Mn | 0.5–3.0 |
| Si | ≦1.0 |
| Ni | 1.5–5.0 |
| Mo | 0.5–3.0 |
| Ti | ≦0.05 |
| Fe | Bal. |
| | plus incidental trace elements. |
| | One preferred alloy contains: |
| C | 0.001–0.06 |
| Mn | 0.5–2.0 |
| Si | 0.1–0.4 |
| Ni | 1.5–3.0 |
| Mo | 0.5–2.0 |
| Ti | 0.01–0.04 |
| Fe | Bal. |
| | plus incidental trace elements. |
| | One particularly preferred alloy contains: |
| C | 0.04 |
| Mn | 1.5 |
| Si | 0.4 |

-continued

| | |
|---|---|
| Ni | 2.5 |
| Mo | 0.6 |
| Ti | 0.03 |
| Fe | Bal. |
| | plus incidental trace elements, including P (0.012%) and S (0.006%). |

In order to achieve alloys of the foregoing composition by submerged arc welding deposition, a wire is used which consists of an alloy powder mixture encased within a carbon steel sheath (e.g., AISE 1008), which alloy powder mixture and sheath combine to form the foregoing alloy.

The invention is further illustrated by the following Example.

EXAMPLE

Welds were made on ¾ inch thick A36 steel plates with a 45° 'V' groove by submerged arc welding using ⅛ inch diameter wire consisting of AISE 1008 sheath encasing alloy powder. The current was 450 amps; the voltage was 28 volts; the travel speed was 16 inches/minute; the heat input was 47 kJ/inch; and the flux was neutral basic. The welds were made according to standard procedure ANSI/AWS A5.17-89. The undiluted weld deposit composition and calculated wire compositions are presented in Tables I and II. The pre-heat and interpass temperatures used for each weld are provided in Table III. Charpy V notch and 0.5 inch round tensile specimens were extracted from the weld centerline according to ANSI/AWS B4.0 and tested in accordance with ASTM E8-95a and E21-92.

TABLE I

All Weld Deposit Compositions

| | Alloy of the Invention | Comparative Alloy-1 | Comparative Alloy-2 |
|---|---|---|---|
| C | 0.04 | 0.15 | 0.09 |
| Mn | 1.5 | 1.0 | 0.87 |
| Si | 0.4 | 0.39 | 0.5 |
| Cr | — | 0.6 | 0.88 |
| Ni | 2.5 | 0.57 | 1.26 |
| Mo | 0.6 | 0.2 | 0.41 |
| Ti | 0.03 | — | — |
| V | — | — | 0.15 |
| P | 0.012 | 0.015 | 0.015 |
| S | 0.006 | 0.004 | 0.004 |
| Fe | Bal. | Bal. | Bal. |

TABLE II

Wire Compositions for Alloys in Table I

| | Alloy of the Invention | Comparative Alloy-1 | Comparative Alloy-2 |
|---|---|---|---|
| C | 0.08 | 0.22 | 0.12 |
| Mn | 1.4 | 0.79 | 0.55 |
| Si | 0.44 | 0.46 | 0.61 |
| Cr | — | 0.54 | 0.85 |
| Ni | 2.8 | 0.48 | 1.3 |
| Mo | 0.56 | 0.19 | 0.4 |
| Ti | 0.2 | — | — |
| V | — | — | 0.12 |
| Fe | Bal. | Bal. | Bal. |

TABLE III

Comparison of the mechanical properties of the weld metal deposited using the alloy of the invention (New Alloy) to that of the current state of the art alloys.

| Experiment No: | Alloy | Preheat (° F.) | IPT (° F.) | PWHT (° F.) | UTS (ksi) | YS (ksi) | E 1% | RA % | Average CVN (ft-lb) |
|---|---|---|---|---|---|---|---|---|---|
| 1 | New Alloy | 200 | 325 | 6 hr @ 1175 | 115.1 | 106.9 | 24.4 | 65.9 | 120 |
| 2 | Alloy - 1 | 200 | 325 | 6 hr @ 1175 | 102.1 | 94.1 | 22.8 | 71.5 | 122 |
| 3 | Alloy - 2 | 200 | 325 | 6 hr @ 1175 | 114 | 104 | 22 | 66 | 69.8 |
| 4 | New Alloy | 200 | 550 | 6 hr @ 1175 | 110.3 | 96.4 | 25.2 | 66.1 | 117 |
| 5 | Alloy - 2 | 200 | 550 | 6 hr @ 1175 | 114 | 105 | 24 | 64 | 52 |
| 6 | New Alloy | 300 | 700 | As Welded | 112.7 | 94.9 | 25 | 42.7 | 110 |
| 7 | Alloy - 2 | 300 | 700 | As Welded | 111.9 | 96.7 | 16.6 | 44.8 | 70 |
| 8 | New Alloy | 300 | 700 | 6 hr @ 1100 | 121.56 | 101.9 | 22.6 | 57.8 | 81 |
| 9 | Alloy - 1 | 300 | 700 | 6 hr @ 1100 | 113.4 | 98.2 | 22.8 | 59.8 | 69.2 |
| 10 | Alloy - 2 | 300 | 700 | 6 hr @ 1100 | 118.7 | 109.2 | 24 | 62.1 | 54 |

TABLE IV

Effect of furnace cooling on the CVN toughness of the alloy of the invention (New Alloy) and Alloy-2;

| Experiment No: | Alloy | Preheat (° F.) | IPT (° F.) | PWHT (° F.) | Average CVN (ft-lb) |
|---|---|---|---|---|---|
| 11 | New Alloy | 300 | 700 | 6 hr @ 1100 & Furnace Cool | 98 |
| 12 | Alloy - 2 | 300 | 700 | 6 hr @ 1100 & Furnace Cool | 55 |

In Table III, experiments 1, 2 and 3 show the results of tests carried out with a preheat of 200° F. and an interpass temperature of 325° F. with a subsequent postweld heat treatment (PWHT) at 1175° F. for 6 hrs. In a practical welding situation this would mean that the welding would have to be interrupted frequently to allow the interpass temperature to fall to below 325° F. in order to maintain a relatively fast cooling rate. Under these conditions (325° F.), Alloy-1 and the alloy of invention (New Alloy) behave similarly with relatively high yield strength (YS) and impact toughness (CVN). Alloy-2 exhibits relatively low impact toughness. However, low interpass temperatures result in low productivity due to the frequent interruptions required for the roll to cool down below the interpass temperature.

When the interpass temperature is raised to 550° F., resulting in an intermediate cooling rate and less frequent interruption of welding operation, experiments 4 and 5 show that the alloy of the invention has more than twice the impact toughness when compared to the present art Alloy-2.

When the interpass temperatures is further raised to 700° F., representing a slow cooling rate, experiments 6 and 7 show that in the as-welded condition, the alloy of the invention has about a 40% higher impact toughness compared to that of Alloy-2.

Figure 2:
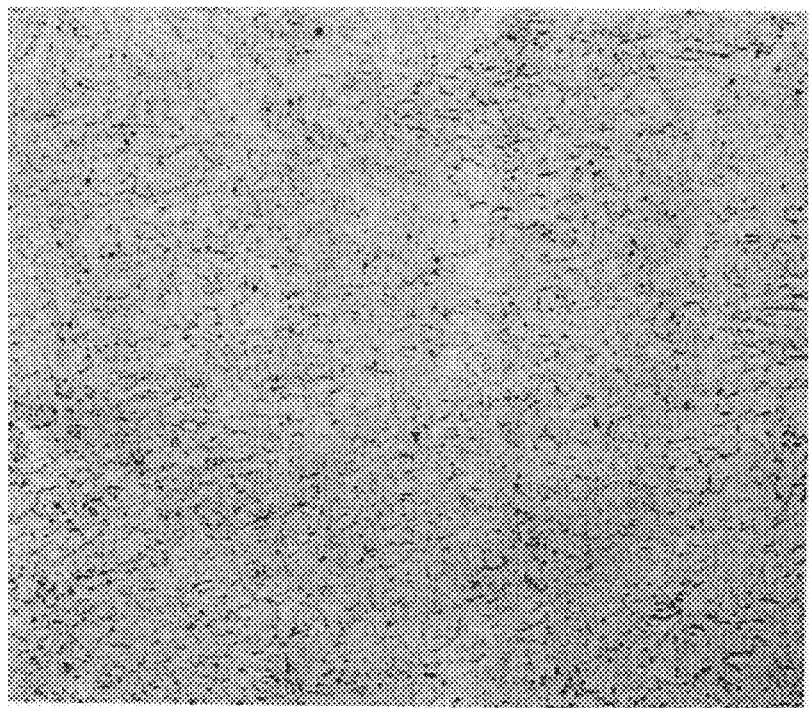
FIG. 2 is a micrograph of the alloy of the invention.
Figure 3:
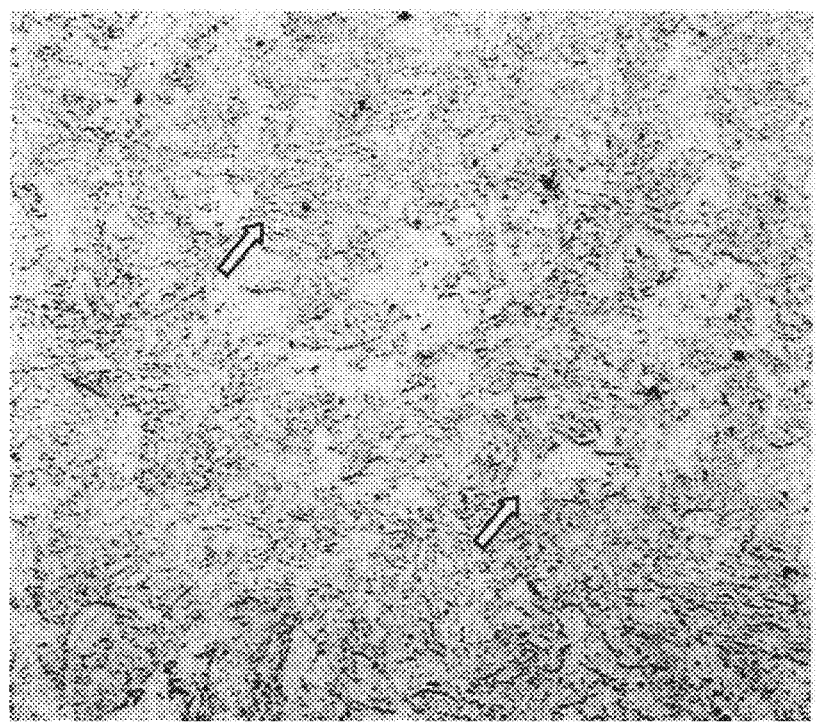
FIGS. 3 and 4 are micrographs of prior art alloys.
Figure 4:

Experiments 8, 9 and 10 reveal the influence of welding using a relatively high interpass temperature of 700° F. followed by PWHT. The high interpass temperature indicates that welding can be conducted on rolls without interruption thus resulting in increased productivity. Although Alloys-1 and Alloy-2 as well as the alloy of the invention posses comparable yield strengths, the alloy of the invention retains higher impact toughness. The deterioration of the toughness of Alloy-1 and Alloy-2 is related to the fact that they contain higher levels of carbon and carbide formers such as chromium and vanadium. Carbide precipitation during PWHT results in a degradation of the impact toughness. Carbide precipitation also results in a loss of hardness at elevated temperatures as shown in FIG. 1. The alloy of the invention retains its hardness even after exposure to temperatures as high as 1200° F. when compared to Alloy 1 which suffers a rapid loss of hardness after exposure to temperatures above 900° F. Loss in hardness results in a loss of compressive strength, while compressive strength is a critical property for roll build-up materials. Since the alloy of the invention has a very low carbon content and does not contain any carbide formers, there is no deterioration of impact toughness with PWHT. A micrograph of the alloy of the invention in the PWHT condition is shown in FIG. 2. The microstructure is bainitic without any detectable carbide precipitation. In contrast, the microstructure of Alloy-1 contains some carbides and polygonal ferrite (FIG. 3) which is detrimental to toughness. FIGS. 3 and 4 show the microstructures in the PWHT condition of Alloys 1 and 2 respectively. There is significant carbide precipitation in these alloys due to the higher carbon and carbide formers (Cr, V) content. This is further demonstrated in Table IV where the alloy of the invention and Alloy-2 have been welded at an interpass temperature of 700° F. and have been then furnace cooled from the PWHT temperature of 1100° F. Such furnace cooling to room temperature requires a period of almost 24 hours, which would simulate potential temperature exposures in caster roll applications. This relatively slow cooling rate exacerbates any carbide precipitation problems. The alloy of the invention (experiment 11) retains impact toughness almost twice that of Alloy-2 (experiment 12).

In summary, the alloy of invention maintains high strength and toughness levels over a wide range of welding conditions. This wide range of welding conditions is in contrast to the high cooling rate conditions required with Alloy-1, which rates severely limit productivity. Alloy-2 does not meet the impact toughness requirements under any welding condition. Thus the alloy of invention can be deposited with the highest productivity (high preheat and interpass temperature). At the same time, it results in deposits that have higher yield strength and impact toughness when compared to the present art Alloys 1 and 2. This results in reconditioned rolls that have significantly better resistance to deformation as well as the ability to resist the propagation of any cracks that may have initiated in the overlay material.

As various changes could be made in the above embodiments without departing from the scope of the invention, it is intended that all matter contained in the above description shall be interpreted as illustrative and not in a limiting sense.

What is claimed is:

1. A low alloy steel composition constituting a wire for use in submerged arc flux-shielded deposition onto industrial components to build up a layer thereon which is resistant to impact, temper embrittlement, and high temperature abrasion and comprising less than about 0.1% C by weight, between about 1.5% and about 5.0% Ni by weight, between about 0.5% and about 3.0% Mo by weight, and wherein V and Cr are excluded from the low alloy steel sufficiently to avoid any significant precipitation of V carbide and Cr carbide upon deposition of said low alloy steel by welding onto an industrial component.

2. The low alloy steel of claim 1 wherein Nb, W, and B are excluded from the low alloy steel sufficiently to avoid any significant precipitation of Nb carbide, W carbide, and B carbide upon deposition of said low alloy steel by welding onto an industrial component.

3. The low alloy steel of claim 1 containing essentially no Cr and essentially no V.

4. The low alloy steel of claim 2 containing essentially no Nb, W, or B.

5. The low alloy steel of claim 3 wherein elements which form carbides are excluded from the low alloy steel sufficiently to avoid any significant precipitation of carbides upon deposition of said low alloy steel by welding onto an industrial component.

6. The low alloy steel of claim 1 having a microstructure consisting of bainitic ferrite with essentially no carbides, essentially no martensite, and essentially no austenite.

7. The low alloy steel of claim 1 consisting essentially of, by weight %:

| C | ≦0.1 |
|---|---|
| Mn | 0.5–3.0 |
| Si | ≦1.0 |
| Ni | 1.5–5.0 |
| Mo | 0.5–3.0 |
| Ti | ≦0.05 |
| Fe | Balance. |

8. The low alloy steel of claim 7 consisting essentially of, by weight %:

| C | 0.001–0.06 |
|---|---|
| Mn | 0.5–2.0 |
| Si | 0.1–0.4 |
| Ni | 1.5–3.0 |
| Mo | 0.5–2.0 |
| Ti | 0.01–0.04 |
| Fe | Balance. |

9. The low alloy steel of claim 8 consisting essentially of, by weight %:

| C | 0.04 |
|---|---|
| Mn | 1.5 |
| Si | 0.4 |
| Ni | 2.5 |
| Mo | 0.6 |
| Ti | 0.03 |
| P | 0.012 |
| S | 0.006 |
| Fe | Balance. |

10. A low alloy steel constituting a wire for use in submerged arc flux-shielded deposition onto industrial components to build up a layer thereon which is resistant to impact, temper embrittlement, and high temperature abrasion and having a composition comprising less than about 0.1% C by weight, between about 1.5% and about 5.0% Ni by weight, between about 0.5% and about 3.0% Mo by weight, and wherein V and Cr are excluded from the alloy composition sufficiently to avoid any significant precipitation of V carbide and Cr carbide upon deposition of the alloy by welding under conditions of 700° F. interpass temperature and postweld heat treatment for 6 hours at 1100° F.

11. The low alloy steel of claim 10 wherein Nb, W, and B are excluded from the alloy composition sufficiently to avoid any significant precipitation of Nb carbide, W carbide, and B carbide upon deposition of the alloy steel by welding under said conditions.

12. The low alloy steel of claim 10 containing essentially no Cr and essentially no V.

13. The low alloy steel of claim 11 containing essentially no Nb, W, or B.

14. The low alloy steel of claim 10 having a microstructure consisting of bainitic ferrite with essentially no carbides.

15. The low alloy steel of claim 10 wherein elements which form carbides upon deposition by welding under said conditions are excluded from the alloy sufficiently to avoid any significant precipitation of carbides upon deposition of the alloy by welding under said conditions.

16. The low alloy steel of claim 10 consisting essentially of, by weight %:

| C | ≦0.1 |
|---|---|
| Mn | 0.5–3.0 |
| Si | ≦1.0 |
| Ni | 1.5–5.0 |
| Mo | 0.5–3.0 |
| Ti | ≦0.05 |
| Fe | Balance. |

17. The low alloy steel of claim 16 consisting essentially of, by weight %:

| C | 0.001–0.06 |
|---|---|
| Mn | 0.5–2.0 |
| Si | 0.1–0.4 |
| NI | 1.5–3.0 |
| Mo | 0.5–2.0 |
| Ti | 0.01–0.04 |
| Fe | Balance | wherein the low alloy steel has a yield strength of greater than about 95 ksi and yields a Charpy V notch absorbed energy value of at least about 80 ft-lbs at room temperature after deposition by welding under said conditions.

18. The low alloy steel of claim 17 consisting essentially of, by weight %:

| C | 0.04 |
|---|---|
| Mn | 1.5 |
| Si | 0.4 |
| Ni | 2.5 |
| Mo | 0.6 |
| Ti | 0.03 |
| P | 0.012 |
| S | 0.006 |
| Fe | Balance. |

19. A build up layer on a steel mill caster roll which is resistant to impact, temper embrittlement, and high temperature abrasion, the layer having been deposited onto the steel mill caster roll by welding deposition under conditions including exposure to temperatures above about 700° F. and having an overlayer deposited thereover, the build up layer having a composition comprising less than about 0.1% C by weight, between about 1.5% and about 5.0% Ni by weight, and between about 0.5% and about 3.0% Mo by weight, and wherein V and Cr are excluded from the build up layer composition sufficiently that there is no significant precipitation of V carbide and Cr carbide in said layer.

20. The build up layer of claim 19 wherein Nb, W and B are excluded from the build up layer composition sufficiently that there is no significant precipitation of Nb carbide, W carbide, and B carbide in said layer.

21. The build up layer of claim 20 wherein elements which form carbides upon deposition by welding under said conditions are excluded from the build up layer composition sufficiently that there is no significant precipitation of carbides in said layer.

22. The build up layer of claim 19 consisting essentially of, by weight %:

| | |
|---|---|
| C | ≦0.1 |
| Mn | 0.5–3.0 |
| Si | ≦1.0 |
| Ni | 1.5–5.0 |
| Mo | 0.5–3.0 |
| Ti | ≦0.05 |
| Fe | Balance. |

23. The build up layer of claim 22 consisting essentially of, by weight %:

| | |
|---|---|
| C | 0.001–0.06 |
| Mn | 0.5–2.0 |
| Si | 0.1–0.4 |
| Ni | 1.5–3.0 |
| Mo | 0.5–2.0 |
| Ti | 0.01–0.04 |
| Fe | Balance. |

24. The build up layer of claim 23 consisting essentially of, by weight %:

| | |
|---|---|
| C | 0.04 |
| Mn | 1.5 |
| Si | 0.4 |
| Ni | 2.5 |
| Mo | 0.6 |
| Ti | 0.03 |
| P | 0.012 |
| S | 0.006 |
| Fe | Balance. |

25. The low alloy steel of claim 10 in the form of a wire for use in depositing a build up layer by welding deposition onto industrial components, the alloy steel wire having a composition comprising less than about 0.1% C by weight, between about 1.5% and about 5.0% Ni by weight, and between about 0.5% and about 3.0% Mo by weight, and wherein V and Cr are excluded from the wire composition sufficiently that there is no significant precipitation of V carbide and Cr carbide in said build up layer upon welding deposition under conditions including exposure to temperatures above about 700° F.

26. The low alloy steel of claim 25 wherein Nb, W and B are excluded from the wire composition sufficiently that there is no significant precipitation of Nb carbide, W carbide, and B carbide in said build up layer upon welding deposition under said conditions.

27. The low alloy steel of claim 26 wherein elements which form carbides upon deposition by welding under conditions are excluded from the wire composition sufficiently that there is no significant precipitation of carbides in said build up layer upon welding deposition under said conditions.

28. The low alloy steel of claim 25 consisting essentially of, by weight %:

| | |
|---|---|
| C | ≦0.1 |
| Mn | 0.5–3.0 |
| Si | ≦1.0 |
| Ni | 1.5–5.0 |
| Mo | 0.5–3.0 |
| Ti | ≦0.05 |
| Fe | Balance. |

29. The low alloy steel of claim 28 consisting essentially of, by weight %:

| | |
|---|---|
| C | 0.001–0.06 |
| Mn | 0.5–2.0 |
| Si | 0.1–0.4 |
| Ni | 1.5–3.0 |
| Mo | 0.5–2.0 |
| Ti | 0.01–0.04 |
| Fe | Balance. |

30. A steel mill caster roll which is resistant to impact, temper embrittlement, and high temperature abrasion, the roll comprising a low alloy steel layer having a composition comprising less than about 0.1% C by weight, between about 1.5% and about 5.0% Ni by weight, and between about 0.5% and about 3.0% Mo by weight, and wherein V and Cr are excluded from the alloy steel composition sufficiently that there is no significant precipitation of V carbide and Cr carbide in said layer.

* * * * *